Patented Aug. 5, 1941

2,251,835

UNITED STATES PATENT OFFICE 2,251,835

PRODUCTION OF TETRAHYDROFURANE FROM 1,4-BUTYLENE GLYCOL

Walter Reppe, Ludwigshafen-on-the-Rhine, and Hans-Georg Trieschmann, Mannheim, Germany, assignors, by mesne assignments, to General Aniline & Film Corporation, New York, N. Y., a corporation of Delaware No Drawing. Application April 19, 1940, Serial No. 330,470. In Germany May 5, 1939

7 Claims. (Cl. 260—345)

The present invention relates to the production of tetrahydrofurane from 1, 4-butylene glycol.

We have found that tetrahydrofurane may be prepared in a smooth and efficient manner by heating 1, 4-butylene glycol together with water in the presence of catalysts promoting the splitting off of water under superatmospheric pressure to temperatures exceeding 180° C., preferably exceeding 200° C.

The reaction conditions under which 1, 4-butylene glycol and water are heated to produce tetrahydrofurane are preferably so chosen that a substantial part of the glycol and water remains liquid during the reaction. The most favorable reaction temperatures are within the range between 200 and 330° C. since within that range most of the starting materials may be kept in the liquid state without difficulty and since at substantially higher temperatures there might be formed also butadiene. The lowest pressure to be actually used for a specific temperature within the above range corresponds to the vapor pressure of the mixture of water with 1, 4-butylene glycol and tetrahydrofurane. The pressure may be made higher than that corresponding to the vapor pressure of this mixture, for example by employing an inert diluent gas.

As catalysts promoting the splitting off of water there may be mentioned in particular acid or neutral dehydration catalysts which may be either dissolved or suspended in the reaction liquid. There may be used for example primary or secondary calcium phosphate, sulfates of heavy metals or also acid oxides such as tungsten or molybdenum oxide or heteropoly acids such as tungsten-molybdenum acid or tungsten-phosphoric acid. Aluminum oxide, thorium oxide, silicic acid gel or bleaching earth are also suitable. These catalysts may be added to the starting mixture which is to be led through the reaction vessel or they may be rigidly arranged within the reaction vessel. Particularly valuable catalysts are organic and inorganic acids and salts thereof having an acid reaction under reaction conditions which are soluble in aqueous 1, 4-butylene glycol solutions, for example hydrochloric acid, phosphoric acid or sulfuric acid or formic acid and its next higher homologues, chloroacetic acid or oxalic acid, sodium bisulfate or ammonium chloride which reacts acid under the reaction conditions.

The concentration of these catalysts dissolved in the starting mixture should be preferably so high that the pH-value of the solution is under reaction conditions at most about 5 but preferably not so high that the pH value is substantially below 2. Generally speaking, the amount of the catalyst is smaller than that equimolecular to the amount of water to be split off. It is sufficient to add a few per cent or even only fractions of one per cent, e. g. from 0.1 to 0.2 per cent of these substances to the starting solution.

The 1, 4-butylene glycol solution used as starting material usually contains from 30 to 80 per cent by weight of water. The invention may most suitably be applied to butylene glycol solutions as they are obtained in hydrogenating aqueous butine-2-diol-1, 4 solutions which are formed when treating aqueous, about 35 per cent solutions of formaldehyde with acetylene in the presence of copper acetylide, preferably under superatmospheric pressure.

The process according to our invention may be carried out discontinuously or continuously. The aqueous 1, 4-butylene glycol solution may be pressed first into a preheater and then through a tube or a plurality of tubes maintained at the proper reaction temperature. The speed at which the solution is pressed through the reaction vessel should be so that all or at least part of the 1, 4-butylene glycol is dehydrated. Since the reaction is somewhat exothermic heating of the reaction vessels may entirely be dispensed with, provided that the throughput is high enough. After leaving the reaction vessel, the mixture is led into a still connected with a fractionating column after having released the pressure through a valve. By fractional distillation the aqueous tetrahydrofurane solution may easily be separated into water and tetrahydrofurane containing about 4 per cent of water.

The following examples serve to illustrate the principle of our invention but they are not intended to restrict the scope of the invention to these particular examples. The parts are by weight unless otherwise stated.

Example 1

1420 parts of 1, 4-butylene glycol which are in the form of a 35 per cent aqueous solution are subjected to a pressure of 120 atmospheres, preheated to about 300° C. and then led at 310° C. through a tube charged with aluminum oxide at a rate of 0.5 liter per hour per each liter of the catalyst chamber. Heating of the reaction vessel is not necessary since the reaction is slightly exothermic. The pressure of the reaction mixture leaving the reaction chamber is released, and the mixture led into a still connected with a fractionating column. At the lower part of the still the water originally contained in the starting mixture and that formed in the reaction may be drawn off, whereas at the upper part of the column there distils off a mixture containing 96 per cent by weight of tetrahydrofurane and 4 per cent of water which mixture boils at 66° C. This mixture may be treated with sodium chloride and sodium hydroxide in order to remove the water and then purified by further distillation. 1090 parts of pure tetrahydrofurane are thus obtained corresponding to 96 per cent of the theoretical yield.

*Example 2*

A 35 per cent aqueous solution of 949 parts of 1,4-butylene glycol is admixed with 4 parts of phosphoric acid and then heated in a closed vessel to 290° C. and then led at 280° C. through a heat-insulated tube at a rate of 0.5 liter per hour and per 1 liter of the volume of the tube. The pressure amounts to from 90 to 100 atmospheres. When working up the reaction mixture in the manner described in Example 1, there are obtained 747 parts of anhydrous tetrahydrofurane, corresponding to 98.5 per cent of the theoretical yield.

*Example 3*

8 parts of oxalic acid and 2 parts of phosphoric acid are added to 2700 parts of a 35 per cent aqueous crude 1,4-butylene glycol solution as it is obtained in the condensation of aqueous formaldehyde with acetylene in the presence of copper acetylide and subsequent catalytic hydrogenation. A precipitate which might be formed is filtered off, and the filtrate is treated in the manner described in Examples 1 and 2. Tetrahydrofurane is obtained in a yield of 98.5 per cent.

*Example 4*

540 grams of an aqueous 35 per cent 1,4-butylene glycol solution is admixed with 2 grams of phosphoric acid and the whole is heated in a pressure-tight vessel having a volume of 2 liters to 280° C. for 10 hours under a pressure of about 90 atmospheres. The whole is then allowed to cool and then distilled. There are obtained 141 grams of pure tetrahydrofurane.

*Example 5*

8 parts of phosphoric acid are added to 2700 parts of a crude 1,4-butylene glycol solution as obtained in the manner described in Example 3. The mixture is subjected to a pressure of 120 atmospheres, heated to 230° C. and then led at 235° C. through a heat-insulated tube at a rate of 0.5 liter per hour and per 1 liter of the volume of the tube. The mixture obtained is worked up in the manner described in Example 1, whereby 726 parts of pure tetrahydrofurane are obtained.

*Example 6*

2 grams of ammonium chloride are added to 540 grams of an aqueous 35 per cent 1,4-butylene glycol solution. The whole is heated in a pressure-tight vessel having a volume of 2 liters to 230° C. for 12 hours. The reaction mixture is allowed to cool, filtered off and then distilled. There are obtained 142 parts of pure tetrahydrofurane.

What we claim is:

1. A process for the production of tetrahydrofurane which consists in heating an aqueous solution of 1,4-butylene glycol containing at least about 30 per cent of water to temperatures exceeding 180° C. in the presence of a dehydration catalyst said catalyst being used in an amount smaller than equimolecular to the amount of water to be split off from the 1,4-butylene glycol under such an elevated pressure that a substantial part of the reaction mixture is in the liquid phase.

2. A process for the production of tetrahydrofurane which consists in heating an aqueous solution of 1,4-butylene glycol containing at least about 30 per cent of water to temperatures exceeding 180° C. in the presence of a dehydration catalyst having an acid to neutral reaction said catalyst being used in an amount smaller than equimolecular to the amount of water to be split off from the 1,4-butylene glycol under such an elevated pressure that a substantial part of the reaction is in the liquid phase.

3. A process for the production of tetrahydrofurane which consists in heating an aqueous solution of 1,4-butylene glycol containing from 30 to 80 per cent of water to temperatures exceeding 180° C. in the presence of a dehydration catalyst having an acid to neutral reaction said catalyst being used in an amount smaller than equimolecular to the amount of water to be split off from the 1,4-butylene glycol under such an elevated pressure that a substantial part of the reaction mixture is in the liquid phase.

4. A process for the production of tetrahydrofurane which consists in heating an aqueous solution of 1,4-butylene glycol containing at least about 30 per cent of water to temperatures between 200 and 330° C. in the presence of a dehydration catalyst having an acid to neutral reaction under such a pressure that a substantial part of the reaction mixture is in the liquid phase said catalyst being used in an amount smaller than equimolecular to the amount of water to be split off from the 1,4-butylene glycol.

5. A process for the production of tetrahydrofurane which consists in heating an aqueous 1,4-butylene glycol solution containing from 30 to 80 per cent of water to temperatures between 200 and 330° C. in the presence of a dehydration catalyst having an acid to neutral reaction under such a pressure that a substantial part of the reaction mixture is in the liquid phase said catalyst being used in an amount smaller than equimolecular to the amount of water to be split off from the 1,4-butylene glycol.

6. A process for the production of tetrahydrofurane which consists in heating an aqueous 1,4-butylene glycol solution containing from 30 to 80 per cent of water to temperatures between 200 and 330° C. in the presence of a mineral acid under such a pressure that a substantial part of the reaction mixture is in the liquid phase said mineral acid being used in an amount smaller than equimolecular to the amount of water to be split off from the 1,4-butylene glycol.

7. A process for the production of tetrahydrofurane which consists in heating an aqueous 1,4-butylene glycol solution containing from 30 to 80 per cent of water to temperatures between 200 and 330° C. in the presence of phosphoric acid under such a pressure that a substantial part of the reaction mixture is in the liquid phase.

WALTER REPPE.
HANS-GEORG TRIESCHMANN.